(12) United States Patent
Madigan et al.

(10) Patent No.: US 10,859,068 B2
(45) Date of Patent: Dec. 8, 2020

(54) ELECTRIC PROPULSION POWER CIRCUIT

(71) Applicant: Aerojet Rocketdyne, Inc., Sacramento, CA (US)

(72) Inventors: Michael Madigan, Woodinville, WA (US); Alexandr L. Kristalinski, Kirkland, WA (US); Brian Koch, Woodinville, WA (US)

(73) Assignee: AEROJET ROCKETDYNE, INC., Redmond, WA (US)

( * ) Notice: Subject to any disclaimer, the term of this patent is extended or adjusted under 35 U.S.C. 154(b) by 876 days.

(21) Appl. No.: 15/305,176

(22) PCT Filed: Jun. 2, 2014

(86) PCT No.: PCT/US2014/040474
§ 371 (c)(1),
(2) Date: Oct. 19, 2016

(87) PCT Pub. No.: WO2015/187118
PCT Pub. Date: Dec. 10, 2015

(65) Prior Publication Data
US 2017/0074252 A1    Mar. 16, 2017

(51) Int. Cl.
*F03H 1/00* (2006.01)
*B64G 1/42* (2006.01)
*B64G 1/40* (2006.01)

(52) U.S. Cl.
CPC .......... *F03H 1/0018* (2013.01); *B64G 1/405* (2013.01); *B64G 1/428* (2013.01)

(58) Field of Classification Search
CPC . F03H 1/00–0093; B64G 1/405; B64G 1/406; B64G 1/428
See application file for complete search history.

(56) References Cited

U.S. PATENT DOCUMENTS

| | | |
|---|---|---|
| 3,781,653 A | 12/1973 | Marini |
| 5,414,238 A | 5/1995 | Steigerwald et al. |
| 5,605,039 A | 2/1997 | Meyer et al. |
| 5,726,505 A | 3/1998 | Yamada et al. |
| 6,369,521 B1 | 4/2002 | Cardwell, Jr. et al. |
| 2015/0288041 A1* | 10/2015 | Forte .................. H01M 8/2483 429/9 |

OTHER PUBLICATIONS

Todd "Extend Current Transformer Range" (Year: 1999).*
Wikipedia "Kirchhoff's circuit laws" (Year: 2015).*
International Search Report and Written Opinion dated Oct. 7, 2014 for PCT/US14/40474.

* cited by examiner

*Primary Examiner* — Scott J Walthour
*Assistant Examiner* — William L Breazeal

(57) ABSTRACT

A circuit (400, 700, 800) comprising: a first power source (402) supplying first current to a load (470) during a first Period of Time ("PoT"); a second power source (416) supplying a second current to the load during a second POT; a Unidirectional Current Valve ("UCV") in series with the first power source; a current detector (420, 702, 802) in series with the UCV (422); and a switch (424) in parallel with a series combination of the current detector and UCV to bypass the UCV during the second PoT. The current detector determines whether the second period of time has commenced and whether the switch has closed.

19 Claims, 9 Drawing Sheets

ELECTRIC PROPULSION POWER CIRCUIT

BACKGROUND

Statement of the Technical Field

The disclosure relates to Electric Propulsion ("EP") systems. More particularly, the disclosure concerns power circuits for EP systems.

Description of the Related Art

Typically in a satellite or spacecraft, power flows from one or more power sources to a Power Management and Distribution ("PMD") system. From there, the power is distributed to all loads. The loads include, but are not limited to, bus loads, payloads and an EP system. The PMD system includes a collection of circuits comprising filters, batteries, converters, isolation circuits and regulators. During operation, the PMD system outputs a regulated bus voltage that is distributed throughout the bus to the EP system, bus loads, payloads, and battery chargers. The bus loads include, but are not limited to, vehicle communication, guidance, navigation and control.

The EP system comprises a reaction thruster and a thruster power supply. In general, the reaction thruster is configured for use on the satellite or spacecraft to assist in adjusting its position when in orbit around the earth, to move it into the desired orbit, or for propelling it during long missions (e.g., inter-planetary missions). The reaction thruster may include a plasma based thruster. Plasma based thrusters are well known in the art, and therefore will not be described in detail herein.

The thruster power supply is implemented as a Discharge Power Supply ("DPS"). The DPS drives the discharge of the reaction thruster. In this regard, the DPS includes a switching circuit and an electric discharge device. A transformer interconnects the switching circuit and electric discharge device. The switching circuit is connected to the primary winding of the transformer. The electric discharge device is connected to the secondary winding of the transformer. The transformer converts a relatively low pulsed voltage applied to its primary winding into a relatively high pulsed output voltage. The pulsed output voltage is then supplied to the electric discharge device so as to cause the reaction thruster to enter an arc state. Once the reaction thruster transitions into its arc state, the thruster power supply enters into a low voltage, high current mode. In this mode, the regulated bus voltage is supplied to the electric discharge device.

SUMMARY

The disclosure concerns a power supply circuit. The power supply circuit comprises a first power source, a second power source, a unidirectional current valve, a current detector, and a switch. The first power source supplies a first current to a load (e.g., an electrical discharge device) during a first period of time. The second power source supplied a second current to the load during a second period of time. The unidirectional current valve (e.g., a diode) is connected in series with the second power source. The switch is connected in parallel with a series combination of the current detector and the unidirectional to bypass the unidirectional current valve during the second period of time. The current detector determines whether the second period of time has commenced and whether the switch has closed.

In some scenarios, current flow through the unidirectional current valve indicates that an electrical arc has been formed between two electrodes of a reaction thruster. A controller may perform operations to close the switch responsive to the detection by the current detector of current flow through the unidirectional current valve at the end of the first period of time. Closure of the switch is determined to have occurred when an absence of current flow through the unidirectional current valve is detected at the beginning of the second period of time. In contrast, closure of the switch is determined to have not occurred when current flow through the unidirectional current valve is still detected at the beginning of the second period of time. The controller may also perform operations to cause the power supply circuit to take at least one remedial measure responsive to a determination by the current detector that closure of the relay did not occur at the beginning of the second period of time. The remedial measure may include, but is not limited to, ceasing a supply of power to the load.

In those or other scenarios, the current detector comprises a current sense transformer with a saturating transformer core. Arc initiation of a reaction thruster is detected based on saturation of the saturating transformer core. Additionally, closure of the switch is detected based on a reset of the saturating transformer core.

In yet other scenarios, the current detector produces arc detection on a separate output terminal pair than relay closure detection. The separate terminal pair detection can be achieved using the following circuit architecture: a transformer, a diode bridge connected to the transformer, a plurality of resistors connected to respective diodes of the diode bridge; and a plurality of comparators, each having a non-inverting input terminal connected to a respective one of the plurality of resistors and an inverting terminal connected to a reference voltage supply.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
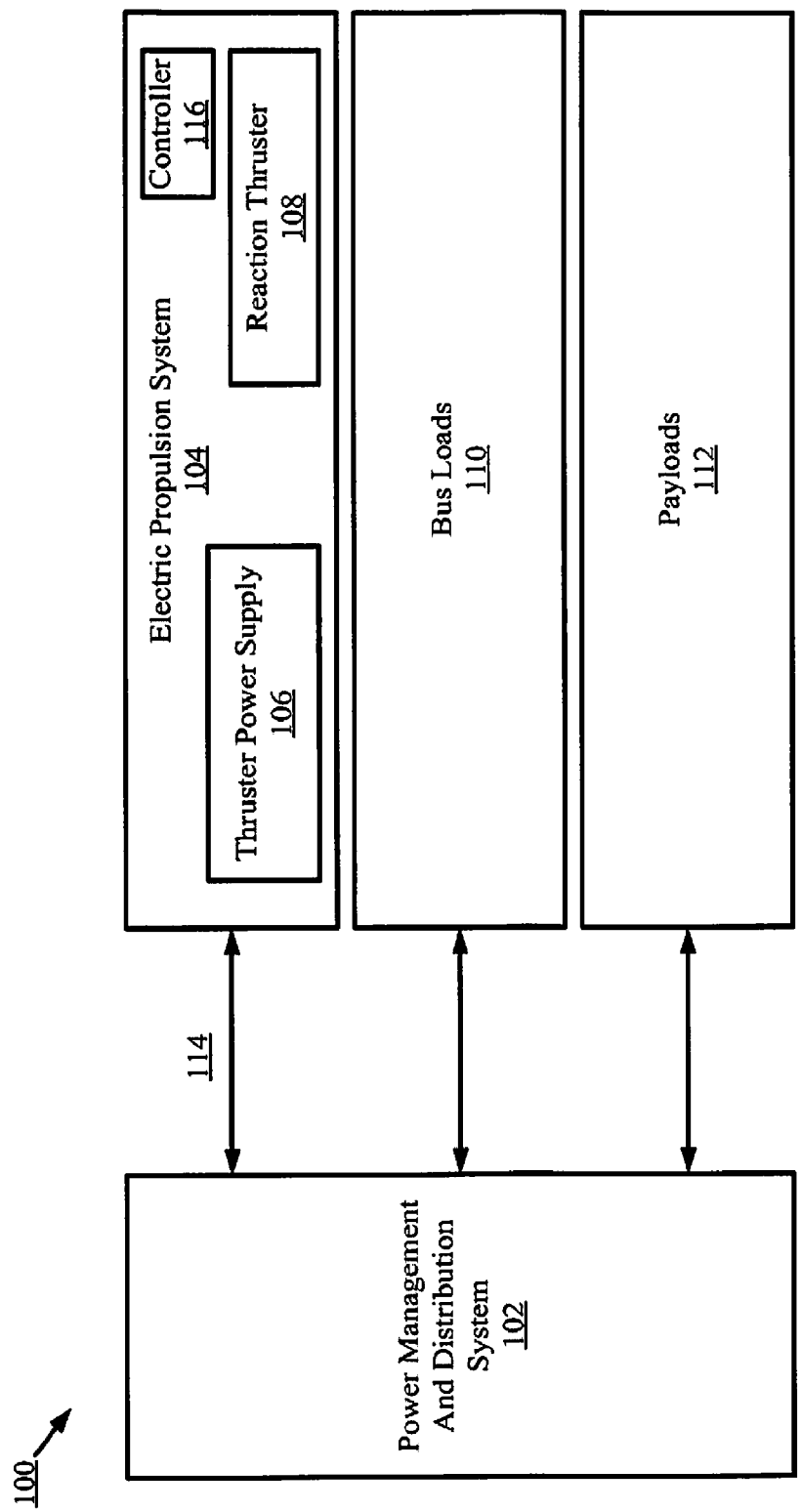
FIG. 1 is a schematic illustration of an exemplary conventional power system for a spacecraft.

Referring now to FIG. 1, there is provided a schematic illustration of an exemplary power system 100 for a spacecraft (not shown), satellite (not shown), or other vehicle. During operation, power flows from one or more power sources (not shown) to a Power Management and Distribution ("PMD") system 102. The power sources can include, but are not limited to, batteries, fuel cells, and/or solar cells.

The PMD system 102 distributes the power to all loads 104, 110, 112 of the vehicle. In this regard, the PMD system 102 includes a collection of circuits comprising filters, batteries, converters, isolation circuits and/or regulators. The circuits are arranged to output a regulated bus voltage that is distributed throughout the bus to the loads 104, 110, 112, as well as battery chargers. The loads include, but are not limited to, bus loads 110, payloads 112 and an EP system 104. The bus loads 110 include, but are not limited to, vehicle communication, guidance, navigation and control.

The EP system comprises a reaction thruster 108 and a thruster power supply 106. The reaction thruster includes, but is not limited to, a plasma based reaction thruster. Plasma based reaction thrusters are well known in the art, and therefore will not be described in detail herein. Still, it should be noted that a plasma based reaction thruster comprises two electrodes between which an arc of electricity is formed. Propellant is provided in the path of the arc of electricity. The heat generated by the arc causes the propellant to turn into plasma, thereby creating a charged gas cloud. The plasma is propelled between the two electrodes. Since the plasma is charged, the propellant effectively completes the circuit between the electrodes, allowing current to flow through the plasma. The flow of electrons generates an electromagnetic field which then exerts a Lorentz force on the plasma. The application of this force causes the plasma to be accelerated out of the thruster exhaust at high velocity so as to produce thrust.

The thruster power supply 106 is generally configured to supply power to the reaction thruster 108 so as to turn it "on" and "off". In this regard, the regulated bus voltage output from the PMD system 102 is distributed to the thruster power supply 106, as shown by reference number 114. The regulated bus voltage is used by the thruster power supply 106 to start the firing of the reaction thruster 108.

Figure 2:
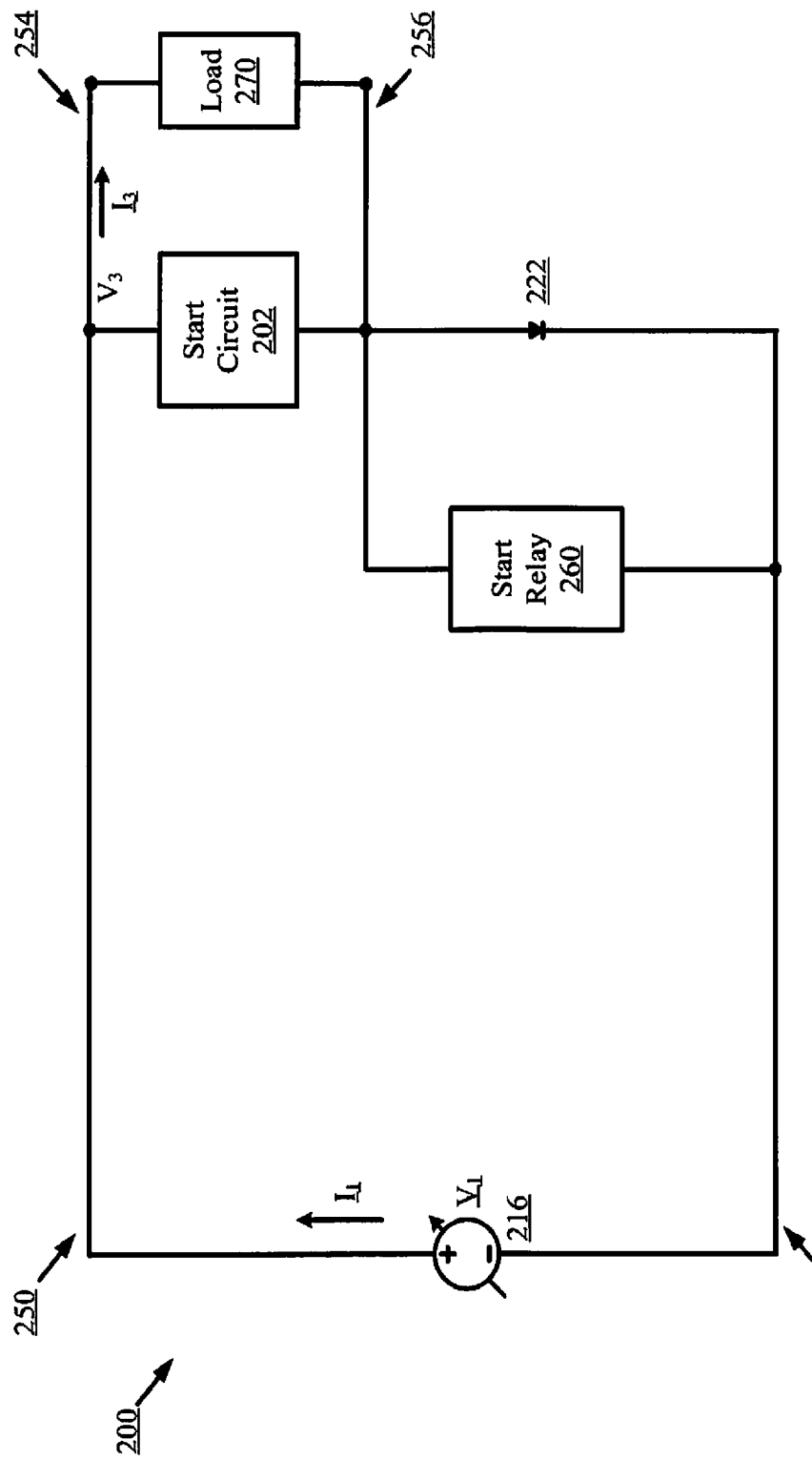
FIG. 2 is a circuit diagram for an exemplary architecture for a conventional thruster power supply.

A circuit diagram of an exemplary conventional architecture for a thruster power supply 200 is provided in FIG. 2. As shown in FIG. 2, the thruster power supply 200 comprises a circuit connected between a pair of input lines 250, 252 and a pair of output lines 254, 256. More specifically, a bus power source 216 is connected between the pair of input lines 250, 252. A start circuit or power source 202 is connected in parallel with the bus power source 216 across the pair of input lines. The start circuit 202 is also connected across the output lines 254, 256 so as to be arranged in parallel with a load 270. The start circuit 202 is generally configured to supply pulses of a relatively high voltage and a relatively low current to the load 270 during a first period of time. A diode 222 is connected in parallel with the start circuit 202 across the input lines 250, 252. The diode 222 generally prevents current spikes from damaging other circuits during the first period of time. A start relay or switch 224 is connected in parallel with the diode 222. The start relay 224 generally provides a means to enable the bypass of diode 222 during a second period of time which is subsequent to the first period of time.

Figure 3:
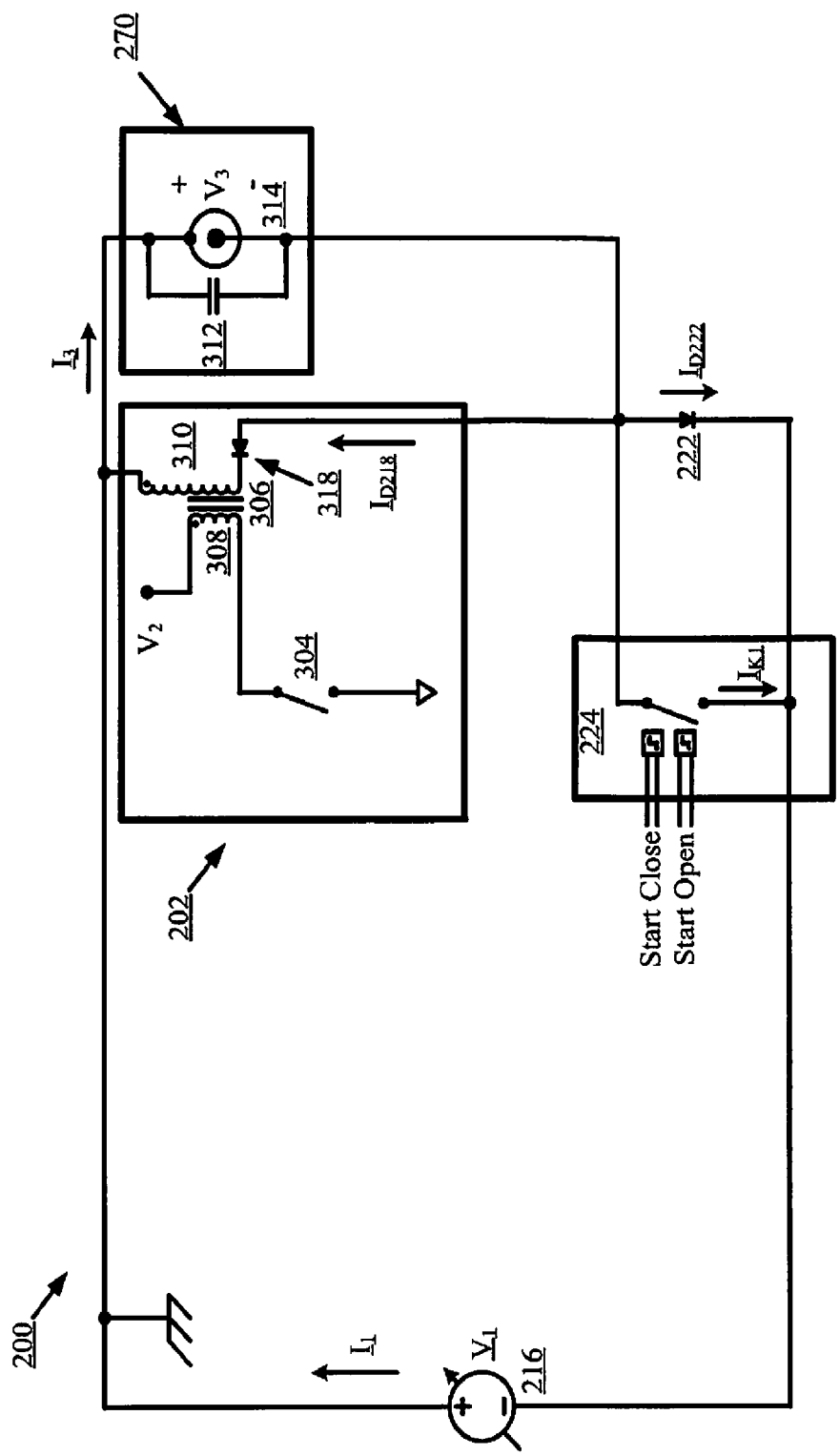
FIG. 3 is a more detailed circuit diagram for the exemplary architecture for a conventional thruster power supply shown in FIG. 2.

A more detailed circuit diagram for the thruster power supply 200 is provided in FIG. 3. As shown in FIG. 3, the start circuit 202 is generally configured to cause the thruster power supply 200 to operate in a relatively High Voltage (e.g., 4000 Volts), Low Current ("HVLC") mode. The HVLC mode is first employed to cause a reaction thruster to enter into its arc stage or state. Thereafter, the bus power supply 216 is employed to transition the thruster power supply 200 to a relatively Low Voltage, High Current ("LVHC") mode. In this regard, the bus power supply 216 outputs a bus voltage $V_1$ of a relatively low value (e.g., 120 Volts—direct current) and a bus current $I_1$ of a relatively high value (e.g., 10 Amps). The bus power equals the result of multiplying the bus voltage $V_1$ by the bus current $I_1$. Since the bus current $I_1$ is relatively high, the bus power is also relatively high.

In order to strike an arc between the electrodes (not shown) of the reaction thruster, short pulses of relatively high voltage (e.g., 4000 Volts—direct current) and relatively low current need to be applied to a capacitor 312 of the load 270 so as to charge the same to a level which is suitable to cause a breakdown of a gaseous propellant upon discharge thereof.

The start circuit 202 is configured to provide the short pulses of high voltage to the capacitor 312. As such, the start circuit 202 comprises a switch 304 and a transformer 306. The switch 304 is opened and closed in a pulsed manner so as to cause the transformer 306 to output short pulses of relatively high voltage $V_3$ and relatively low current $I_3$.

The transformer 306 transfers energy from its primary winding 308 to its secondary winding 310 through electromagnetic induction. In effect, the transformer 306 changes a relatively low pulsed input voltage $V_2$ (e.g., 100 Volts) to a higher pulsed output voltage $V_3$ (e.g., 1000-4000 Volts). The pulsed output voltage $V_3$ is then supplied to the capacitor 312, which is connected in series with the secondary winding 310 of the transformer 306 and in parallel with the electrical discharge device 314.

A diode 318 is provided between the capacitor 312 and the secondary winding 310 of the transformer 306. The diode 318 ensures that the capacitor 312 does not discharge between pulses. Accordingly, charge can be built up in the capacitor 312 over the course of multiple pulses (e.g., 2-3 pulses) to a level which is suitable to cause a breakdown of the gaseous propellant. Breakdown of the gaseous propellant results in the discharge of capacitor 312. When the capacitor 312 is discharged, the reaction thruster is transitioned into its arc stage/state. In the arc stage/state, an arc of electricity is formed between the electrodes (not shown) of the reaction thruster.

Diode 222 ensures that high voltage does not cause damage to bus power supply 216. In this regard, the diode 222 is reverse biased during the capacitor charging stage. When the diode 222 is reverse biased, no current flows therethrough. Current $I_{D222}$ begins to flow through the diode 222 when the reaction thruster enters its arc stage/state. Thereafter, the thruster power supply 200 transitions from its HVLC mode to its LVHC mode. This mode transition is achieved by the natural commutation of bypass diode 222. High current losses in bypass diode 222 are then abated by closing the start relay 224, thereby allowing the bus voltage $V_1$ to flow through the electrical discharge device 314 and bypass diode 222.

In some scenarios, a fault in the system may prevent the closure of start relay 224. If the start relay 224 does not close, then the diode 222 is exposed to the full bus current $I_1$ (e.g., 10 Amps). The bus current $I_1$ exposes the diode 222 to relatively large excess power loss (e.g., 70 Watts of loss). If the diode 222 is not oversized to sustain high power, the excess power loss will cause significant damage thereto. Thus, there is a need to ensure that the start relay 224 has actually closed shortly after the detection of the thruster's arc state.

Accordingly, the present invention provides an improved version of a thruster power supply in which the potential of diode damage can be minimized. In this regard, the thruster power supply of the present invention comprises a means to confirm actual relay closure and trigger certain remedial events when such confirmation cannot be obtained. The present invention will now be described in relation to FIGS. 4-9.

Figure 4:
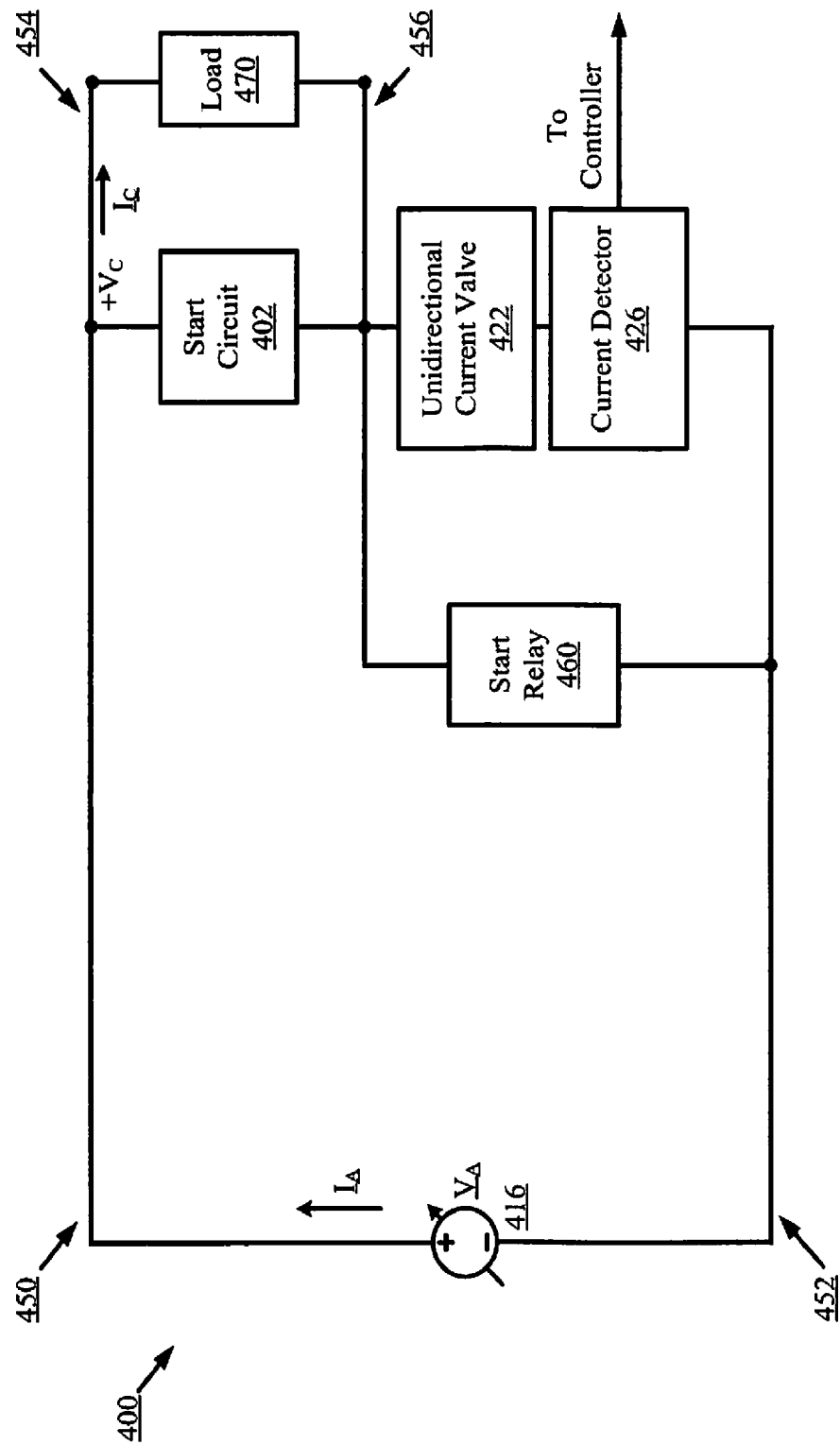
FIG. 4 is a circuit diagram of an exemplary architecture for a novel thruster power supply.

Referring now to FIG. 4, there is provided a schematic illustration of an exemplary architecture for a thruster power supply 400 that is useful for understanding the present invention. The thruster power supply 106 of FIG. 1 can be the same as or similar to the thruster power supply 400. As such, the following discussion of the thruster power supply 400 is sufficient for understanding the thruster power supply 106.

As shown in FIG. 4, the thruster power supply 400 comprises a circuit that is connectable between a pair of input lines 450, 452 and a pair of output lines 454, 456. More specifically, a bus power source 416 is connected between the pair of input lines 450, 452. A start circuit or power source 402 is connected in parallel with the bus power source 416 across the pair of input lines. The start circuit 402 is also connected across the output lines 454, 456 so as to be arranged in parallel with a load 470. The start circuit 402 is generally configured to supply pulses of a relatively high voltage and a relatively low current to the load 470 during a first period of time. A unidirectional current valve 422 is connected in parallel with the start circuit 402 across the input lines 450, 452. The unidirectional current valve 422 generally prevents current spikes from damaging other circuits during the first period of time. A start relay or switch 424 is connected in parallel with the series combination of a current detector (426) and the unidirectional current valve 422. The start relay 424 generally provides a means to enable the bypass of the unidirectional current valve 422 during a second period of time which is subsequent to the first period of time. During the second period of time, the bus power supply 416 supplies power to the load 470. The bus voltage output from the bus power supply 416 is relatively low as compared to the voltage supplied to the load by the start circuit 402 during the first period of time. Also, the bus current output from the bus power supply 416 is relatively higher as compared to the current supplied to the load 470 by the start circuit 402 during the first period of time.

The current detector 426 is advantageously connected in series with the start circuit 402 and diode 422 across input lines 450, 452, and in parallel with the start relay 460. The current detector 426 generally detects (1) when current flows through the unidirectional current valve 422 at the end of the first period of time (thereby indicating that the second period of time is commencing) and (2) whether or not the start relay 460 actually closed at the start of the second period of time. Information indicating such detections (1) and (2) is communicated to a controller (e.g., controller 116 of FIG. 1). In response to the reception of information indicating detection of the first type (1), the controller performs operations to cause closure of the start relay 460. In response to the reception of information indicating detection of the second type (2), the controller performs operations to cause certain remedial measures to occur. For example, the controller causes the EP system to at least partially shut down.

Figure 5:
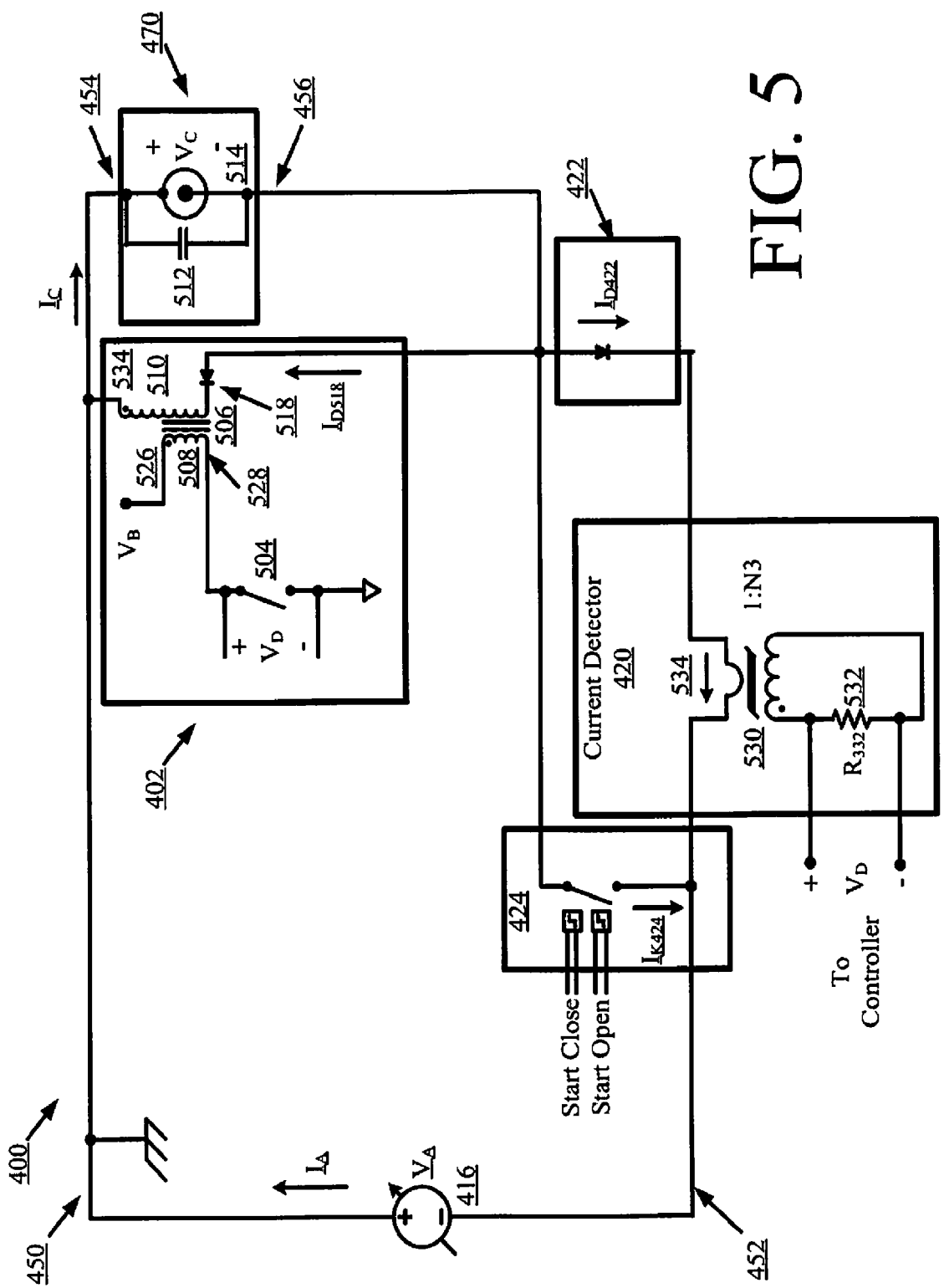
FIG. 5 is a more detailed circuit diagram of the exemplary architecture for a novel thruster power supply shown in FIG. 4.

A more detailed circuit diagram of the thruster power supply 400 is provided in FIG. 5. As shown in FIG. 5, the start circuit 402 is generally configured to cause the thruster power supply 400 to operate in its HVLC mode. The HVLC mode is first employed to cause the reaction thruster 108 to enter its arc stage/state. Thereafter, the bus power supply 416 is employed to transition the thruster power supply 400 to its LVHC mode. In this regard, the bus power supply 416 outputs a bus voltage $V_A$ of a relatively low value (e.g., 120 Volts—direct current) and a bus current $I_A$ of a relatively high value (e.g., 10 Amps). The bus power equals the result of multiplying the bus voltage $V_A$ by the bus current $I_A$. Since the bus current $I_A$ is relatively high, the bus power is also relatively high.

In order to strike an arc of electricity between the electrodes (not shown) in the reaction thruster 108, short pulses of relatively high voltage (e.g., 4000 Volts—direct current) and relatively low current need to be applied to the capacitor 512 of the load 470 so as to charge the same to a level which is suitable to cause a breakdown of a gaseous propellant upon discharge thereof. The start circuit 402 is configured to provide the short pulses of high voltage and low current to the capacitor 512.

In some scenarios, the start circuit 402 comprises a switch 504, a transformer 506 and a unidirectional current valve 518. The switch 504 includes an N-channel Field Effect Transistor ("FET"). N-channel FETs are well known in the art, and therefore will not be described herein. The transformer 506 has a primary winding 508 with 1t turns and a secondary winding 510 with 40t turns, where t is an integer. The unidirectional current valve 518 includes a 5 kV diode. The present invention is not limited to the particularities of these scenarios.

The switch 504 is connected in series with the negative primary winding terminal 528 of the transformer 506. A power supply (not shown) is connected in series with the positive primary winding terminal 526 of the transformer 506. The power supply provides a voltage $V_B$ (e.g., 100 Volts) to the transformer 506. The switch 504 is controlled so as to open and close in a pulsed manner, whereby the transformer 506 is caused to output short pulses of relatively high voltage $V_C$ (e.g., 1000-4000 Volts) and relatively low current $I_C$.

The transformer 506 transfers energy from its primary winding 508 to its secondary winding 510 through electromagnetic induction. In effect, the transformer 506 changes the relatively low pulsed input voltage $V_B$ (e.g., 100 Volts) to a higher pulsed output voltage $V_C$ (e.g., 1000-4000 Volts). The pulsed output voltage $V_C$ is then supplied to the capacitor 512, which is connected in series with a positive secondary winding terminal 534 of the transformer 506.

The unidirectional current valve 518 is connected in series with the secondary winding 510 of the transformer 506. The unidirectional current valve 518 is connected so as to allow current flow from the capacitor 512 to the secondary winding 510 of the transformer 506, but does not allow current flow in a reverse direction. The unidirectional current valve 518 is selected in accordance with a particular application. For example, in some scenarios, the unidirectional current valve 518 is selected as a high voltage diode with a relatively low forward voltage drop (e.g., ranging between 0 Volts and 10 Volts) and a relatively low reverse leakage current (e.g., 5.0 to 80.0 nA). The present invention is not limited in this regard.

During operation, the unidirectional current valve 518 ensures that the capacitor 512 does not discharge between pulses. Accordingly, charge is built up in the capacitor 512 over the course of multiple pulses to a level which is suitable to cause a breakdown of the gaseous propellant upon discharge thereof. When the capacitor 512 is discharged, the reaction thruster 108 transitions into its arc stage/state.

In the arc stage/state, an arc of electricity is formed between the electrodes (not shown) of the reaction thruster 108. Upon initiation of the arc stage/state, the voltage across the capacitor 512 collapses (e.g., from thousands of volts to tens of volts). In effect, unidirectional current valve 422 is forward biased, whereby current flows through input bus power supply 416 to output electrical discharge circuit 514. Consequently, voltage $V_C$ is clamped to voltage $V_A$.

Notably, the unidirectional current valve 422 is reverse biased during the capacitor charging stage. When the unidirectional current valve 422 is reverse biased, no current flows therethrough. Current $I_{D422}$ begins to flow through the unidirectional current valve 422 when the reaction thruster transitions into its arc state. The voltage drop across the unidirectional current valve 422 is relatively high (e.g., >five volts) in order to be rated for the high voltage application. Relay 424 has a significantly lower voltage drop across it in high current applications. The relay 424 is arranged in parallel with the unidirectional current valve 422 such that it can be used to protect the unidirectional current valve 422 from damage in high current applications.

The current detector 426 is positioned in series with the unidirectional current valve 422 across the input lines 450, 452. As such, the current detector 426 is able to determine when the reaction thruster 108 is transitioned to an arc stage/state by detecting the current $I_{D422}$ flow through the unidirectional current valve 422. In some scenarios, the current detector 426 comprises a current sense transformer 530 and a burden resistor 532. The burden resistor 532 converts current in the multi-turn winding of the transformer 530 to an output voltage useful for monitoring operations of the reaction thruster 108.

Once the current detector 426 determines that the reaction thruster 108 has entered its arc stage/state, the thruster power supply 400 transitions from its HVLC mode to its LVHC mode. This mode transition is achieved by closing the start relay 424, thereby allowing the bus voltage $V_A$ to flow through the electrical discharge device 514 and bypass unidirectional current valve 422.

In some scenarios, a fault in the system may prevent the closure of start relay 424. As described above, the unidirectional current valve 422 may be damaged if the start relay 424 does not close shortly after the reaction thruster enters its arc stage. Therefore, the current detector 426 is also positioned between the unidirectional current valve 422 and the start relay 424 such that it may further detect when the start relay 424 has actually closed. When the current detector 420 detects the absence of current flow through the unidirectional current valve 422 during a given period of time, then the closure of relay 424 is deemed to have occurred. In contrast, if the flow of current through the unidirectional current valve 422 is detected during the given period of time, then the closure of relay 424 is deemed to have not occurred.

When closure of the start relay 424 cannot be confirmed, the system may take certain remedial actions to ensure that damage to the unidirectional current valve 422 does not occur as a result of the supply of the relatively high bus current $I_A$ thereto for a relatively long period of time. For example, EP system 104 may be shut down when confirmation of actual closure of relay 424 is not detected during a given period of time. Also, error messages may be generated and communicated to other electronic components of vehicle or systems remote from the vehicle. In response to such error messages, health monitoring and/or repair operations may be performed by internal circuitry of the vehicle.

The position in the circuit 400 and the saturation state of the current detector 426 are key points to the present invention. As noted above, the current detector 426 may comprise a current sense transformer 530. In some scenarios, the current sense transformer 530 has a saturating transformer core. In this case, the primary winding of transformer 530 consists of one turn. The secondary winding of the transformer 530 consists of many turns (e.g., hundreds of turns). The primary winding is coupled to the secondary winding through a magnetically sensitive core (such as a ferrite core). The winding polarity (which is shown in FIG. 5) produces a positive pulse at voltage $V_D$ when the unidirectional current valve 422 is forward biased.

The placement of the primary winding is intentionally on the side of the unidirectional current valve 422 that is electrically connected to the bus power supply 416 in order to avoid the high voltage hazards that would be associated with the start circuit 402. The transformer core saturates due to prolonged exposure to a DC voltage. Core saturation occurs when the core material reaches its limit on the amount of stored energy in the form of magnetic flux. Transformer 530 is initially designed to saturate. Core saturation of transformer 530 is used to detect arc initiation. Core reset is used to detect the closure of the start relay 424.

Figure 6:
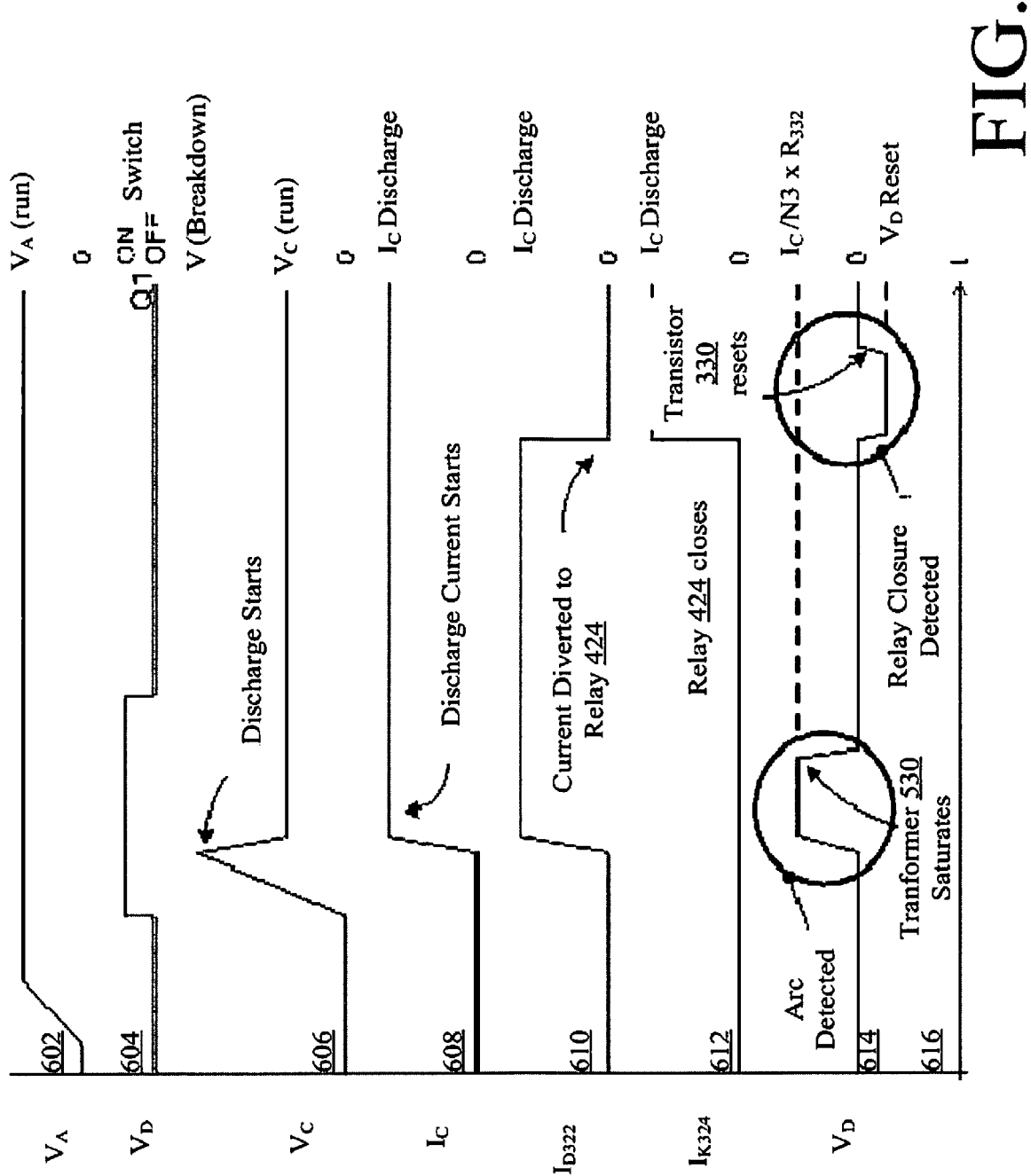
FIG. 6 is a schematic illustration of waveforms illustrating electrical discharge start detection and protective relay closure verification operations of the thruster power supply shown in FIGS. 4-5.

Referring now to FIG. 6, there is provided graphs 602-616 that are useful for understanding electrical discharge start detection and protective relay closure verification operations of the thruster power supply 400. Arc initiation and detection is a product of a successful start procedure applied to the electrical discharge device 514. The start procedure begins with low bus voltage $V_A$ being commanded and reaching operational voltage. Start relay 424 is open during this interval. Then, the start circuit 402 raises above the bus voltage $V_A$ by activating switch 504 (e.g., a FET) and reverse biasing unidirectional current valve 422. When voltage $V_C$ reaches the arc threshold of the electrical discharge device 514, current $I_C$ surges. Thereafter, voltage $V_C$ decays to an operational level of bus voltage $V_A$. The unidirectional current valve 422 forward biases when voltage $V_C$ plus the forward voltage drop therein equals voltage $V_A$. Current now passes through the primary winding of transformer 530 and unidirectional current valve 422. At first, a portion of current $I_{422}$ is reflected to the secondary winding of transformer 530 and measured as voltage $V_D$ across resistor 532. Transformer 530 then saturates due to the DC voltage across resistor 532 in order to form a pulse that is used to detect an arc. Arc detection is used by an external logic system (not shown) to activate relay 424 to close.

Relay closure causes transformer 530 to produce a reset pulse. Relay closure permits energy that is stored in the core of transformer 530 to be released. The transformer 530 generates a reset pulse when the external circuit allows the stored energy to be released from the core. The reset pulse is of the opposite polarity when measured across resistor 532. Closure of relay 524 allows the core to reset by releasing the energy as a negative voltage that is applied to burden resistor 532. The negative pulse is used to detect relay closure.

Figure 7:
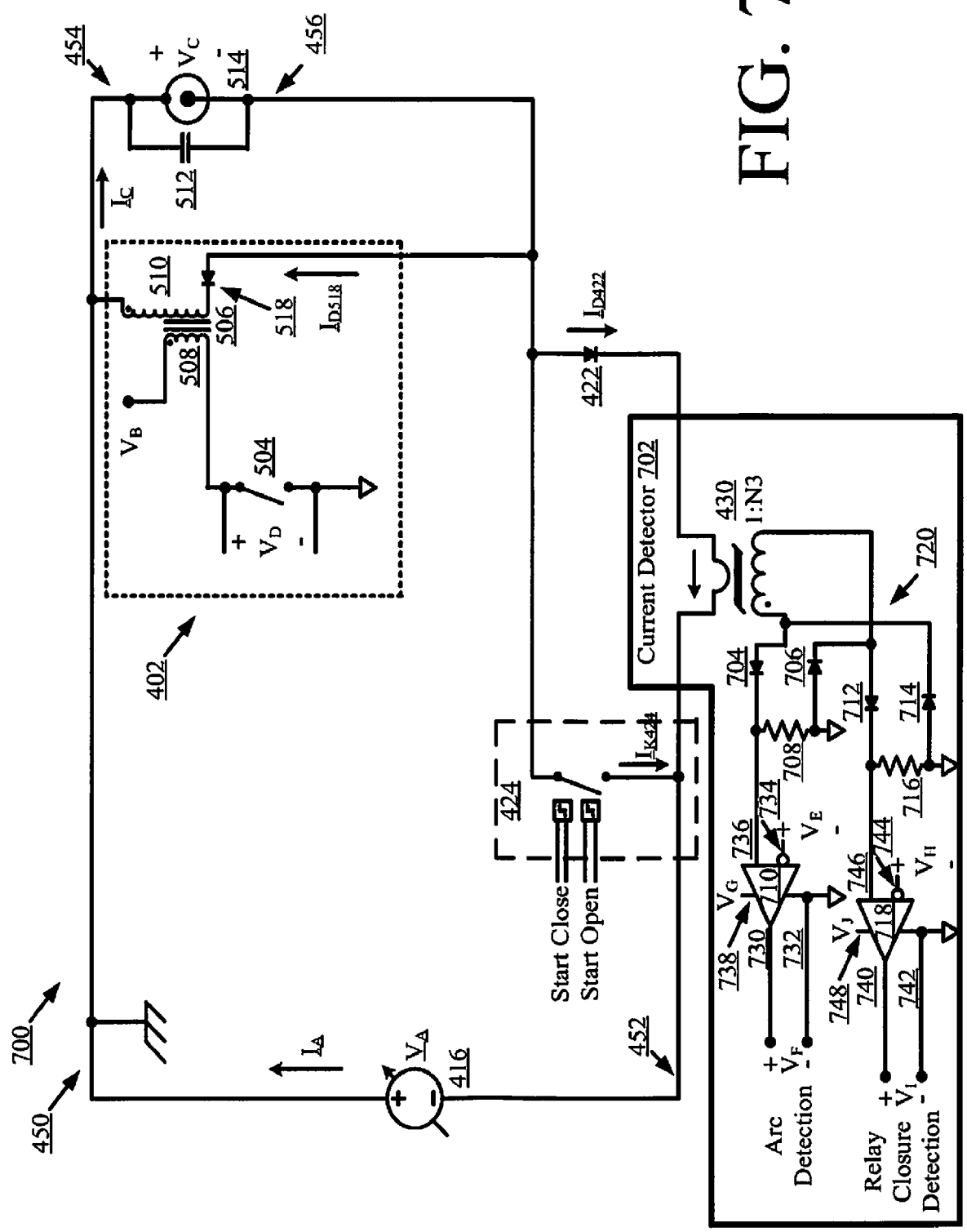
FIG. 7 is a circuit diagram of an exemplary architecture for another novel thruster power supply.

Referring now to FIG. 7, there is provided a schematic illustration of another exemplary architecture for a thruster power supply 700 that is useful for understanding the present invention. The thruster power supply 700 is similar to thruster power supply 400 with the exception of the current detector architecture. As such, the same reference numbers are used for the corresponding components of the thruster power supplies 400 and 700.

As shown in FIG. 7, the current detector 702 includes different circuitry than that of current detector 420. More specifically, burden resistor 532 of FIG. 5 is replaced with burden resistors 708, 716. Additionally, the current detector 702 comprises a diode bridge 720 and voltage comparators 710, 718 such that arc detection can be produced on a separate terminal pair than relay closure detection.

Each voltage comparator 710, 718 is an open loop polarity indicator comprised of an inverting input terminal 734, 744, a non-inverting input terminal 736, 746, a V+ terminal 738, 748, a V− terminal 732, 742 and an output terminal 730, 740. An input power supply voltage $V_C$, $V_J$ is connected directly across the V+ terminal 738, 748 and V− terminal 732, 742 of the voltage comparator 710, 718. The voltage comparator's 710, 718 output voltage $V_F$, $V_I$ is forced to either the comparator's positive saturation level or negative saturation level. For example, if the voltage at non-inverting input terminal 736, 746 is more positive than a voltage of the inverting input terminal 734, 744, then $V_F$, $V_I$ is forced to the comparator's positive saturation level (i.e., the value of the input power supply voltage $V_G$). Alternatively, if the voltage at non-inverting input terminal 736, 746 is less positive than a voltage of the inverting input terminal 734, 746, then $V_F$, $V_I$ is forced to the comparator's negative saturation level (i.e., zero volts).

Notably, voltage comparators 710, 718 are electrically connected in thruster power supply 700 so that output voltages $V_F$ and $V_I$ thereof are compatible with logic voltage thresholds of an external logic system (not shown in FIG. 5). Output voltages $V_F$ and $V_I$ are used by the external logic system (not shown in FIG. 5) to control relay 424 and/or other operations of a vehicle.

During operation, diodes 704 and 706 of the diode bridge 720 commutate an arc detection pulse to burden resistor 708 in order to cause a positive $V_F$ pulse at the output of comparator 710. Similarly, diodes 712, 714 of the diode bridge 720 commutate the relay closure detection pulse to burden resistor 716 in order to cause a positive $V_I$ pulse at the output of comparator 718. The polarity of the connections to comparators 710 and 718 result in voltages $V_F$ and $V_I$ swinging between 0 Volts and $V_G$ or $V_J$, in phase with the voltages across resistors 708 and 716 for positive logic. The circuit can also be connected to have negative logic by trading the comparator positive and negative input connections.

Figure 8:
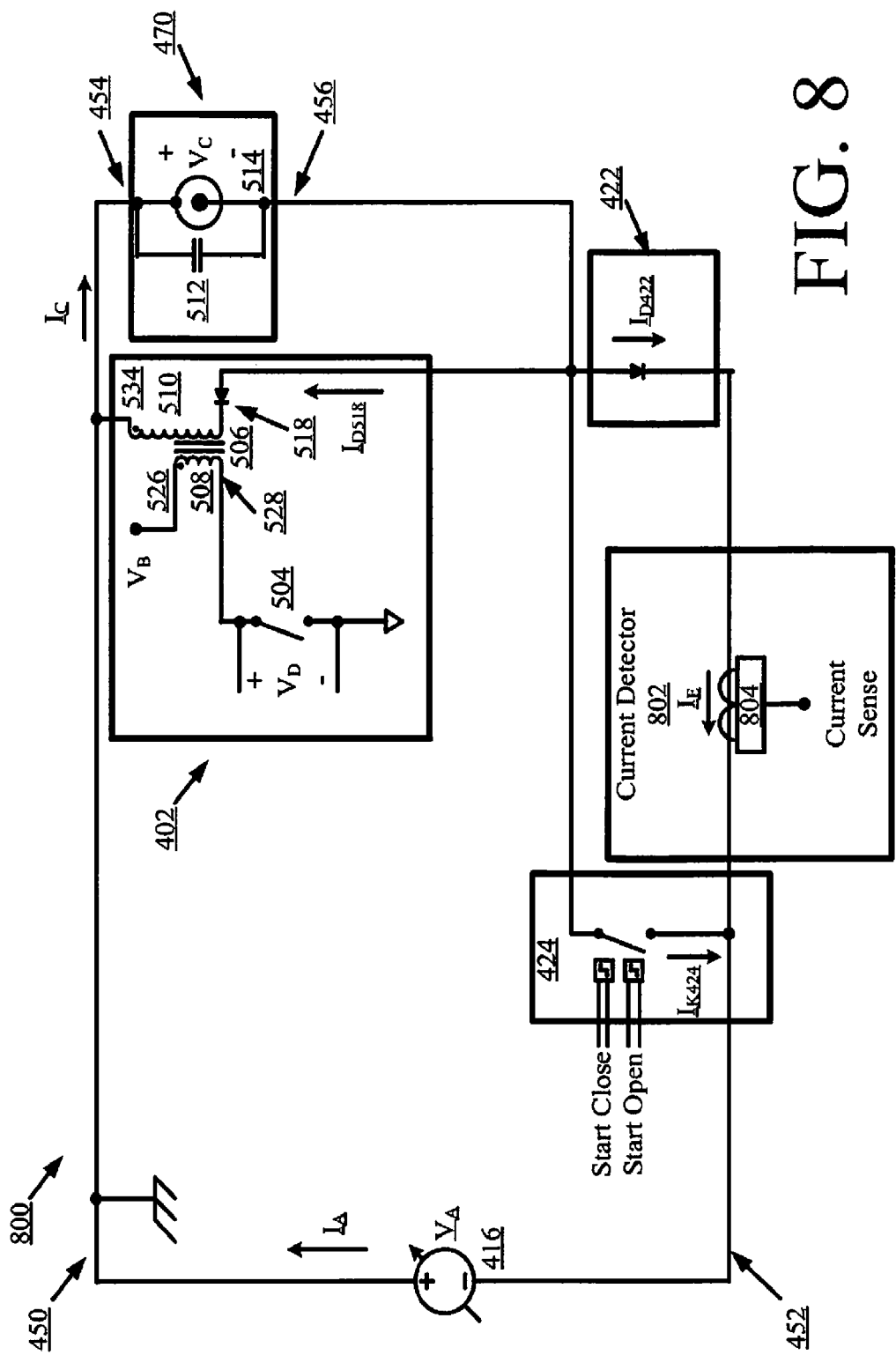
FIG. 8 is a circuit diagram of an exemplary architecture for yet another novel thruster power supply.

Referring now to FIG. 8, there is provided a circuit diagram of an exemplary architecture for yet another novel thruster power supply 800. Thruster power supply 800 is similar to thruster power supply 400 with the exception of the current detector architecture. As such, the same reference numbers are used for the corresponding components of the thruster power supplies 400 and 800.

Figure 9:
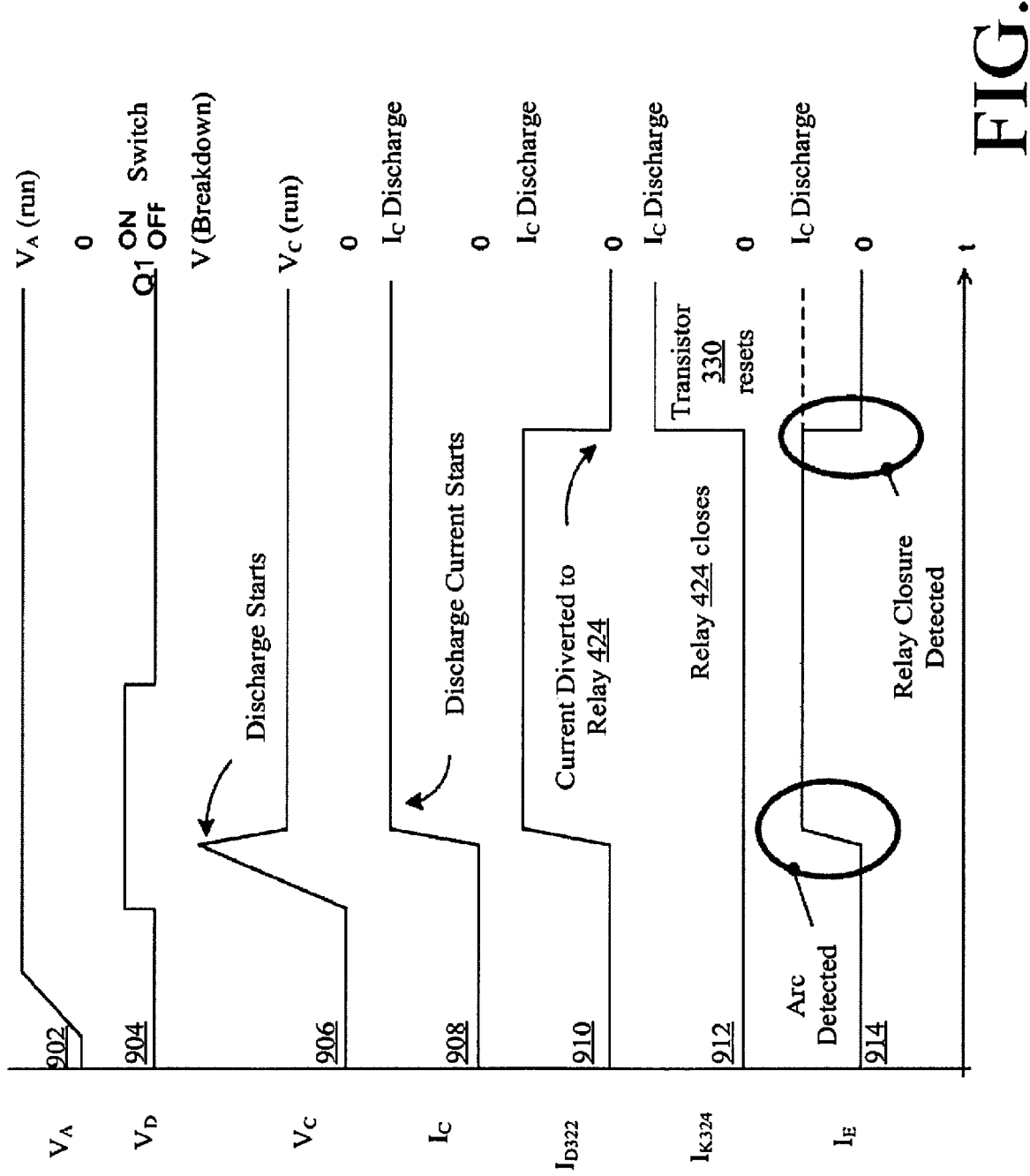
FIG. 9 is a schematic illustration of waveforms illustrating electrical discharge start detection and protective relay closure verification operations of the thruster power supply shown in FIG. 8.

As shown in FIG. 8, the current detector 802 includes different circuitry than that of current detector 420. More specifically, burden resistor 532 of FIG. 5 has been removed from the circuit. As such, the current output from transformer 804 is used to detect (1) when a reaction thruster enters it arc state and (2) whether or not relay 424 actually closed at a given time. A schematic illustration of waveforms 902-914 illustrating electrical discharge start detection and protective relay closure verification operations of the thruster power supply 800 is provided in FIG. 9. FIG. 9 is self-explanatory, and therefore will not be described here.

We claim:

1. A power supply circuit, comprising:
a first power source configured to supply a first current to a load during a first period of time;
a second power source configured to supply a second current to the load during a second period of time;
a unidirectional current valve in series with the second power source;
a current detector in series with the unidirectional current valve such that (i) the unidirectional current valve resides between the second power source and the current detector, and (ii) current flows from the unidirectional current valve in a direction towards the current detector;
a switch in parallel with a series combination of the current detector and the unidirectional current valve to bypass the unidirectional current valve during the second period of time;
wherein the current detector determines whether the second period of time has commenced based on an amount of energy stored by the current detector and determines whether the switch has closed based on generation of a negative pulse by the current detector.

2. The power supply circuit according to claim 1, wherein current flow through the unidirectional current valve indicates that an electrical arc has been formed between two electrodes of a reaction thruster.

3. The power supply circuit according to claim 1, further comprising a controller configured to perform operations to close the switch responsive to a detection by the current detector of current flow through the unidirectional current valve at an end of the first period of time.

4. The power supply circuit according to claim 1, wherein closure of the switch is determined to have not occurred when current flow through the unidirectional current valve is still detected at a beginning of the second period of time.

5. A power supply circuit, comprising:
a first power source configured to supply a first current to a load during a first period of time;
a second power source configured to supply a second current to the load during a second period of time;
a unidirectional current valve in series with the second power source;
a current detector in series with the unidirectional current valve;
a switch in parallel with a series combination of the current detector and the unidirectional current valve to bypass the unidirectional current valve during the second period of time; and
a controller configured to perform operations to cause the power supply circuit to take at least one remedial measure responsive to a determination by the current detector that closure of the switch did not occur at a beginning of the second period of time.

6. The power supply circuit according to claim 5, wherein the at least one remedial measure comprises ceasing a supply of power to the load.

7. The power supply circuit according to claim 1, wherein the current detector comprises a current sense transformer with a saturating transformer core.

8. A power supply circuit, comprising:
a first power source configured to configured to supply a first current to a load during a first period of time;
a second power source configured to supply a second current to the load during a second period of time;
a unidirectional current valve in series with the second power source;
a current detector in series with the unidirectional current valve;
a switch in parallel with a series combination of the current detector and the unidirectional current valve to bypass the unidirectional current valve during the second period of time;

wherein the current detector determines whether the second period of time has commenced and whether the switch has closed;

wherein the current detector comprises a current sense transformer with a saturating transformer core; and wherein the current detector is configured to detect arc initiation of a reaction thruster based on saturation of the saturating transformer core.

9. A power supply circuit, comprising:

a first power source configured to supply a first current to a load during a first period of time;

a second power source configured to supply a second current to the load during a second period of time;

a unidirectional current valve in series with the second power source;

a current detector in series with the unidirectional current valve;

a switch in parallel with a series combination of the current detector and the unidirectional current valve to bypass the unidirectional current valve during the second period of time;

wherein the current detector determines whether the second period of time has commenced and whether the switch has closed;

wherein the current detector comprises a current sense transformer with a saturating transformer core; and wherein the current detector is configured to detect closure of the switch based on a reset of the saturating transformer core.

10. A power supply circuit, comprising:

a first power source configured to supply a first current to a load during a first period of time;

a second power source configured to supply a second current to the load during a second period of time;

a unidirectional current valve in series with the second power source;

a current detector in series with the unidirectional current valve;

a switch in parallel with a series combination of the current detector and the unidirectional current valve to bypass the unidirectional current valve during the second period of time;

wherein the current detector determines whether the second period of time has commenced and whether the switch has closed; and wherein the current detector produces arc detection on a separate output terminal pair than switch closure detection.

11. The power supply circuit according to claim 10, wherein the current detector comprises a transformer, a diode bridge connected to the transformer, a plurality of resistors connected to respective diodes of the diode bridge, and a plurality of comparators, each having a non-inverting input terminal connected to a respective one of the plurality of resistors and an inverting terminal connected to a reference voltage supply.

12. A system, comprising:

a reaction thruster; and a thruster power supply circuit comprising:

a first power source configured to supply a first current to a load during a first period of time;

a second power source configured to supply a second current to the load during a second period of time;

a unidirectional current valve in series with the first power source;

a current detector in series with the unidirectional current valve such that (i) the unidirectional current valve resides between the second power source and the current detector, and (ii) current flows from the unidirectional current valve in a direction towards the current detector;

a switch in parallel with a series combination of the current detector and the unidirectional current valve to bypass the unidirectional current valve during the second period of time; and wherein the current detector determines whether the second period of time has commenced and determines whether the switch has closed based on generation of a negative pulse by the current detector.

13. The system according to claim 12, further comprising a controller configured to perform operations to close the switch responsive to a detection by the current detector of current flow through the unidirectional current valve at an end of the first period of time.

14. The system according to claim 12, wherein closure of the switch is determined to have occurred when an absence of current flow through the unidirectional current valve is detected at a beginning of the second period of time, and closure of the switch is determined to have not occurred when current flow through the unidirectional current valve is still detected at the beginning of the second period of time.

15. A system, comprising:

a reaction thruster; and a thruster power supply circuit comprising:

a first power source configured to supply a first current to a load during a first period of time;

a second power source configured to supply a second current to the load during a second period of time;

a unidirectional current valve in series with the first power source;

a current detector in series with the unidirectional current valve;

a switch in parallel with a series combination of the current detector and the unidirectional current valve to bypass the unidirectional current valve during the second period of time; and a controller configured to perform operations to cause the thruster power supply circuit to take at least one remedial measure responsive to a determination by the current detector that closure of the switch did not occur at a beginning of the second period of time.

16. The system according to claim 12, wherein the current detector comprises a current sense transformer with a saturating transformer core.

17. A system, comprising:

a reaction thruster; and a thruster power supply circuit comprising:

a first power source configured to supply a first current to a load during a first period of time;

a second power source configured to supply a second current to the load during a second period of time;

a unidirectional current valve in series with the first power source;

a current detector in series with the unidirectional current valve;

a switch in parallel with a series combination of the current detector and the unidirectional current valve to bypass the unidirectional current valve during the second period of time; and wherein the current detector determines whether the second period of time has commenced and whether the switch has closed;

wherein the current detector comprises a current sense transformer with a saturating transformer core; and wherein the current detector is configured to detect arc initiation of a reaction thruster based on saturation of the saturating transformer core.

18. A system, comprising:

a reaction thruster; and a thruster power supply circuit comprising:

a first power source configured to supply a first current to a load during a first period of time;

a second power source configured to supply a second current to the load during a second period of time;

a unidirectional current valve in series with the first power source;

a current detector in series with the unidirectional current valve;

a switch in parallel with a series combination of the current detector and the unidirectional current valve to bypass the unidirectional current valve during the second period of time; and wherein the current detector determines whether the second period of time has commenced and whether the switch has closed;

wherein the current detector comprises a current sense transformer with a saturating transformer core; and wherein the current detector is configured to detect closure of the switch based on a reset of the saturating transformer core.

19. A system, comprising:

a reaction thruster; and a thruster power supply circuit comprising:

a first power source configured to supply a first current to a load during a first period of time;

a second power source configured to supply a second current to the load during a second period of time;

a unidirectional current valve in series with the first power source;

a current detector in series with the unidirectional current valve;

a switch in parallel with a series combination of the current detector and the unidirectional current valve to bypass the unidirectional current valve during the second period of time;

wherein the current detector determines whether the second period of time has commenced and whether the switch has closed; and wherein the current detector produces arc detection on a separate output terminal pair than switch closure detection.

* * * * *